(12) United States Patent
Oikawa

(10) Patent No.: US 7,279,816 B2
(45) Date of Patent: Oct. 9, 2007

(54) DRIVING APPARATUS

(76) Inventor: Ichiro Oikawa, 38-50, 2-chome, Shishigaya, Tsurumi-ku, Yokohama, Kanagawa, 230-0073 (JP)

( * ) Notice: Subject to any disclaimer, the term of this patent is extended or adjusted under 35 U.S.C. 154(b) by 0 days.

(21) Appl. No.: 11/152,272

(22) Filed: Jun. 14, 2005

(65) Prior Publication Data

US 2006/0279142 A1   Dec. 14, 2006

(51) Int. Cl.
*H02K 33/00* (2006.01)
(52) U.S. Cl. .......................... 310/36; 310/86
(58) Field of Classification Search ............... 310/36, 310/46, 80, 85–86, 103, 114–115, 118
See application file for complete search history.

(56) References Cited

FOREIGN PATENT DOCUMENTS

| | | |
|---|---|---|
| JP | 59156170 A * | 9/1984 |
| JP | 1-170361 | 7/1989 |
| JP | 5-11788 | 2/1993 |
| JP | 7-75326 | 3/1995 |

* cited by examiner

*Primary Examiner*—Thanh Lam
(74) *Attorney, Agent, or Firm*—Jordan and Hamburg LLP

(57) ABSTRACT

The first magnetic body, second magnetic body and third magnetic body have S-pole at the left end and N-pole at the right end. The second magnetic body acts rightward attractive force on the first magnetic body. The third magnetic body acts leftward attractive force on the first magnetic body. When the first magnetic body is at the left end of the bed, the magnetic shield body is inserted between the first and third magnetic body so that the magnetic attractive force between the first and third magnetic is restrained. A magnetic attractive force from the second magnetic force is mainly acts on the first magnetic body. Then, an rightward acceleration acts in the first magnetic body. Therefore, a driving power can be generated only by a control of a magnetic shield body with minimizing the energy consumption.

1 Claim, 12 Drawing Sheets

Fig, 9

DRIVING APPARATUS

BACKGROUND OF THE INVENTION

1. Field of the Invention

The present invention relates to a driving apparatus using magnetic power.

2. Prior Art

In recent years, attention is highly concentrated on ecology, and a lot of technologies are proposed concerning the saving energy, the natural energy and energy accumulation.

However, there is no driving apparatuses are proposed of saving-energy-type or energy-accumulation-type with controlling magnetic shield body.

As a magnetic shield, body, silicon steel and Fe—Ni are known which introduces most of magnetic fluxes into inside due to extremely high magnetic permeability when they are positioned within a magnetic field. Therefore, devices such as CRT (cathode ray tube) etc. which should be prevented from magnetic influences are covered by a magnetic shield body so that the magnetic flux does not reach the devices.

The magnetic shield body can control the magnetic field existing as a potential and it is expected that a driving power can be generated by much less energy comparing with a means for generating power by field generation.

SUMMARY OF THE INVENTION

The present invention is invented at the background above and has an object to provide a driving apparatus by a magnetic shield control of saving energy type or energy accumulation type.

A driving apparatus according to the present invention comprises a first magnetic body which moves in first and second direction so as to reciprocate, a second magnetic body for generating acceleration of said first magnetic body in said first direction by a magnetic interaction with said first magnetic body, a third magnetic body for generating acceleration of said second magnetic body in said second direction by a magnetic interaction with said first magnetic body, a first magnetic shield body driven by said movement of said first magnetic body in said first direction so as to be inserted between said first and second magnetic body so that said first magnetic shield body restrains said magnetic interaction between said first and second magnetic body, and a second magnetic shield body driven by said movement of said first magnetic body in said second direction so as to be inserted between said first and third magnetic body so that said second magnetic shield body restrains said magnetic interaction between said first and thirst magnetic body.

Therefore, a driving power is generated only by controlling a magnetic shield body with minimizing the energy consumption.

Or, a driving apparatus according to the present invention comprises a rotor having a plurality of N-poles and S-poles on an outer surface, mutually arranged one N-pole after one S-pole with an equal intervals, a cylindrical magnetic body fixed around said rotor concentric with said rotor, which has a plurality of N-poles and S-poles on an inner surface facing said N-poles and S-poles of said rotor, mutually arranged one N-pole after one S-pole with an equal intervals, and a magnetic shield body arranged between said rotor and said cylindrical magnetic body for controlling a magnetic flux between said rotor and said cylindrical magnetic body so that a constant rotation power is occurred on said rotor.

Therefore, a rotation driving power is generated only by controlling a magnetic shield body with minimizing the energy consumption.

DETAILED DESCRIPTION OF THE INVENTION

Next preferred embodiments of driving apparatus according to the present invention are described with reference to the attached drawings.

First Embodiment

Figure 1:
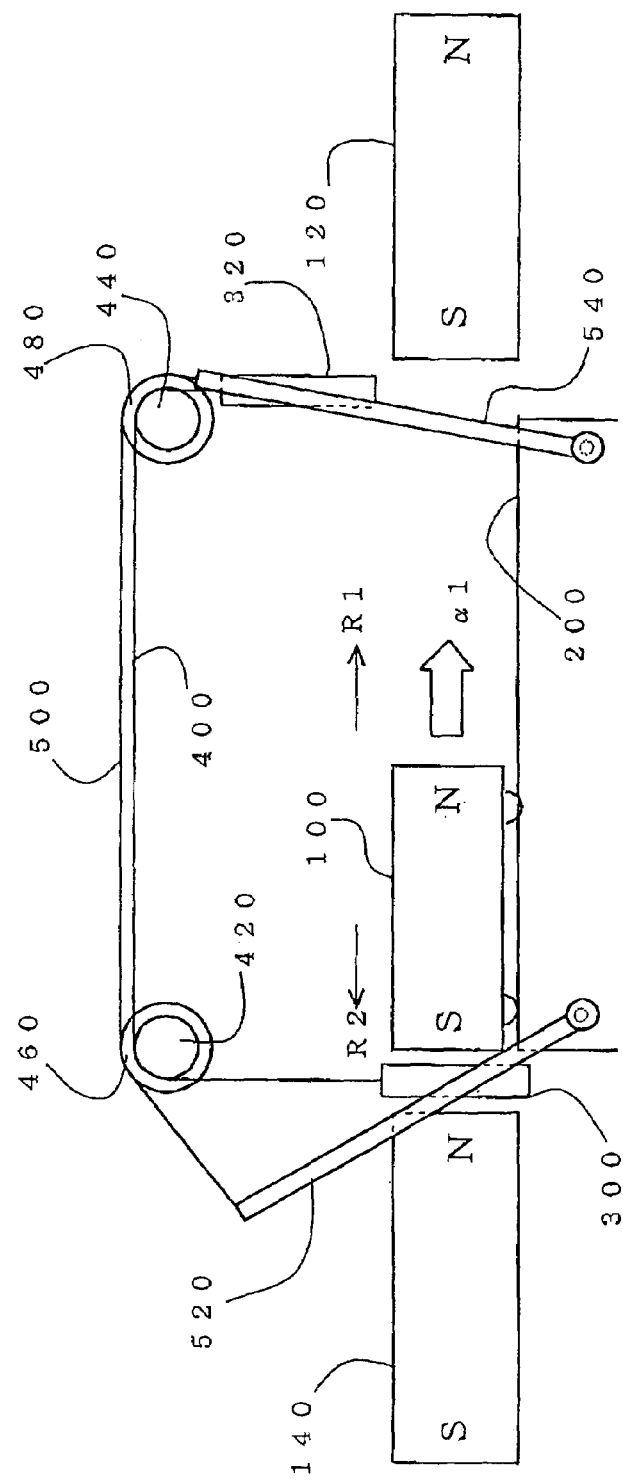
FIG. 1 is an elevation view showing a first embodiment of a driving apparatus according to the present invention.
Figure 2:
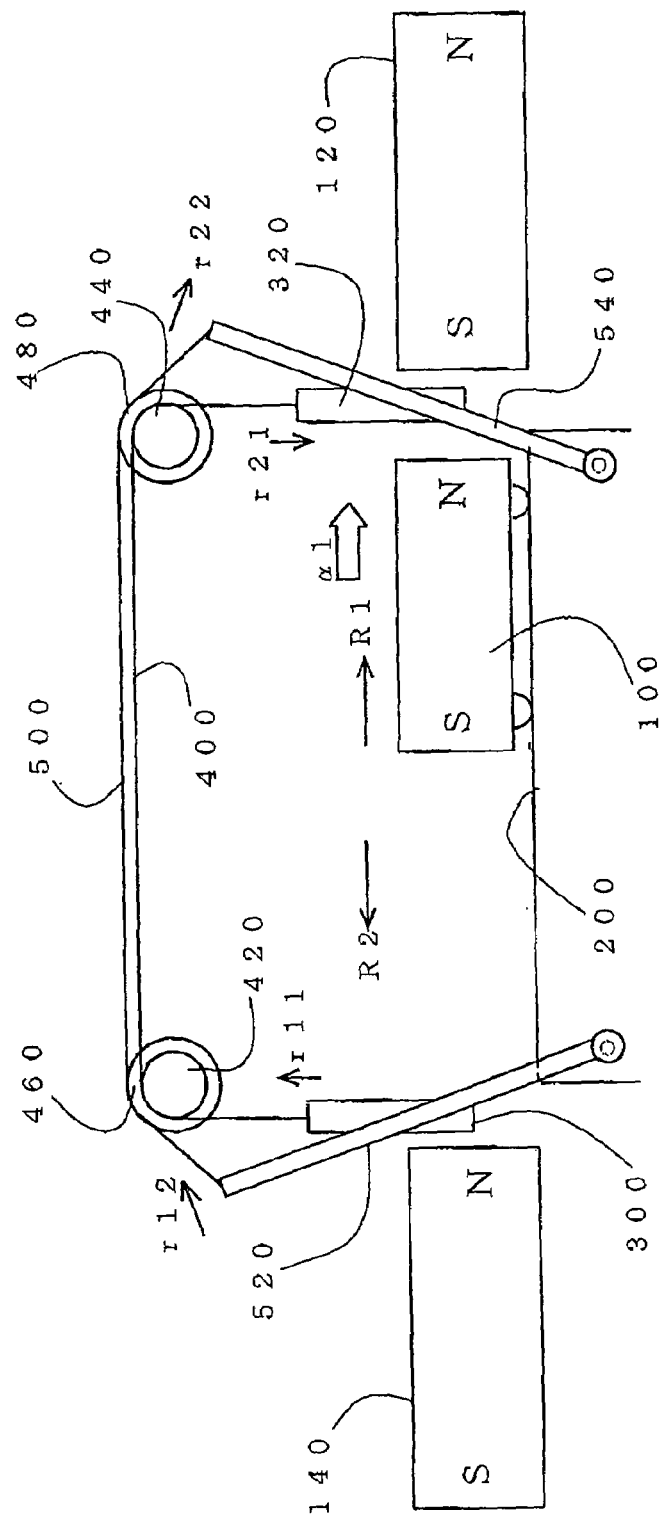
FIG. 2 is an elevation view showing another status of the driving apparatus in FIG. 1.
Figure 3:
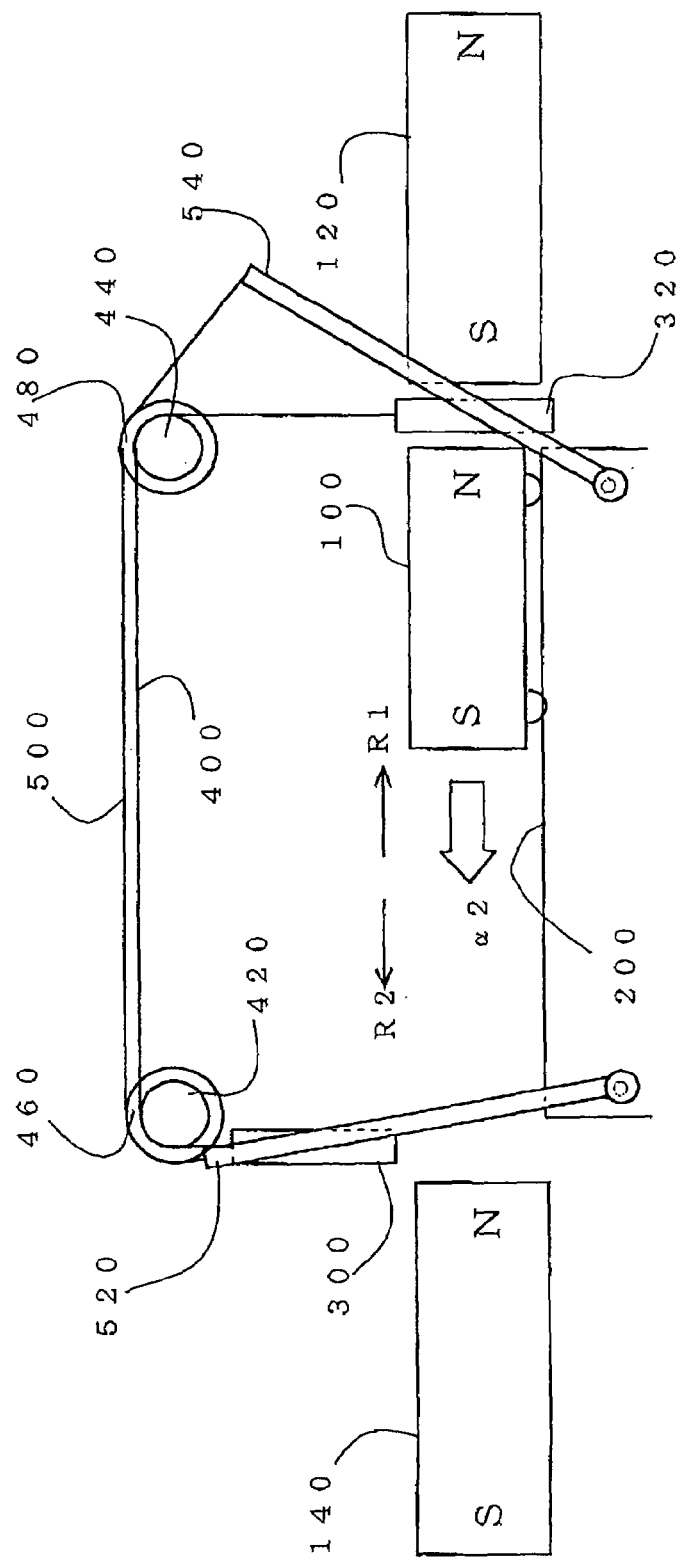
FIG. 3 is an elevation view showing further another status of the driving apparatus in FIG. 1.

FIG. 1 is an elevation view showing the first embodiment of a driving apparatus according to the present invention, FIG. 2 is an elevation view showing the driving apparatus at another status and FIG. 3 is an elevation view showing the driving apparatus at further another status.

In FIGS. 1 to 3, the driving apparatus has a first magnetic body 100 with sufficiently great mass which is horizontally movably supported with sufficiently low friction in the right and left direction on a bed 200.

At a right side of the bed 200, a second magnetic body 120 is provided which generates acceleration of the first magnetic body in a first direction R1 by a magnetic interaction with the first magnetic body 100.

At a left side of the bed 200, a third magnetic body 140 is provided which generates acceleration of the first magnetic body in a second direction R2 by a magnetic interaction with the first magnetic body 100.

At the positional relationship in FIGS. 1 to 3, the first magnetic body 100, the second magnetic body 120 and the third magnetic body 140 have S-pole at the left end and N-pole at the right end. The second magnetic body 120 generates an attractive force in the first magnetic body 100, in the right direction (R1 direction). The third magnetic body 140 generates an attractive force in the first magnetic body, in the left direction (R2 direction).

At the status of FIG. 1, the first magnetic body 100 is positioned at the left end of the bed 200, and a magnetic shield body 300 is inserted between the first magnetic body 100 and the third magnetic body 140. The attractive magnetic force occurs between the first magnetic body 100 and the third magnetic body 140 is restrained. As a result, the attractive magnetic force from the second magnetic body 120 mainly acts on the first magnetic body 100. Therefore, an acceleration a1 in the right direction acts on the first magnetic body 100.

The magnetic shield body 300 is hanged by a wire 400 from the above. The wire is engaged with a pulley 420 at the outer groove around the peripheral, is extended rightward, and is engaged with a pulley 440 at the outer groove around the peripheral, which is positioned above the right end of the bed 200. A right end of the wire 400 is connected with the magnetic shield body 320 so that the magnetic shield body 320 is hanged by the wire 400.

Pulleys 460 and 480 are concentrically connected to the pulleys 420 and 440, respectively, and a wire 500 is engaged with the pulleys 460 and 480. Both ends of the wire 500 are connected upper ends of levers 520 and 540, respectively. The levers 520 and 540 are supported at the left and right ends of the bed 200. The levers 520 and 540 extend upwardly and are swingable in the right and left direction. The upper ends of the levers 520 and 540 are connected with each other.

At the status of FIG. 1, the first magnetic body 100 at the left end position abuts against the lever 520 of the left end so as to rotate and incline the lever 520 leftward. Then, the wire 500 is pulled leftward and the lever 540 of the right end is pulled up to stand substantially vertically.

The pulleys 460 and 480 are driven to rotate when the wire 500 is pulled. Since the pulleys 420 and 440 are concentrically connected with the pulleys 460 and 480, respectively, the pulleys 420 and 440 are driven and rotated together with the pulley 460 and 480.

The pulleys 420 and 440 rotate so as to pull the wire 400 to the left end when the lever 520 inclines leftward. Then, the magnetic shield body 300 is moved downward and the magnetic shield body 320 is pulled upwardly. As a result, the magnetic shield 300 is inserted between the first magnetic body 100 and the third magnetic body 140 as shown in FIG. 1.

On the other hand, as shown in FIG. 3, the pulleys 420 and 440 rotate so as to pull the wire 400 to the right end when the lever 540 inclines rightward. Then, the magnetic shield body 300 is moved upwardly and the magnetic shield body 320 is pulled upwardly. As a result, the magnetic shield body 300 is inserted between the first magnetic body 100 and the third magnetic body 140 as shown in FIG. 1.

The attractive magnetic force occurs between the first magnetic body 100 and the second magnetic body 120 is restrained. And the attractive magnetic force from the third magnetic body 140 mainly acts on the first magnetic body 100. Therefore, an acceleration a2 in the left direction acts on the first magnetic body 100.

FIG. 2 shows a middle status during transfer from the status of FIG. 1 to the status of FIG. 3. During the lever 540 is inclined in the right direction r22, the magnetic shield body 300 moves upwardly (r11 direction), as well as, the magnetic shield body 320 moves downward (r21 direction). While, the lever 520 is pulled by the wire 500 in the right direction r12 up to stand.

The first magnetic body 100 has sufficiently great mass and pushes the levers 520 and 540 by not only the magnetic force but also great inertia force. The energy consumption of the magnetic body 100 due to the friction with the bed 200 and the energy consumption for driving the magnetic shield bodies 300 and 320 are substantially negligible.

The levers 520 and 540 are inclined leftward and rightward, respectively, by the first magnetic body 100 which abuts the levers 520 and 540, and the magnetic shield bodies 300 and 320 are dropped down by the levers 520 and 540, respectively.

When the first magnetic body reaches the left-end of the bed 200, the first magnetic body 100 drops the magnetic shield body 300 down so as to generates the rightward acceleration a1 of the first magnetic body 100, and when the first magnetic body reaches the right-end of the bed 200, the first magnetic body 100 drops the magnetic shield body 320 down so as to generates the leftward acceleration a2 of the first magnetic body 100. Therefore, the first magnetic body 100 is reciprocated. Then, the pulleys 420, 440, 460 and 480 are driven and rotate and the wires 400 and 500 are driven so at to reciprocate. So, driving force may be obtained from any of the first magnetic body 100, pulleys 420, 440, 460 and 480 and wires 400 and 500.

In order to obtain the driving force from the first magnetic body 100, a link, a wire and other power transmission means may be connected to the first magnetic body 100.

As mentioned above, a driving force can be generated only by the control of the magnetic shield bodies 300 and 320 by the first magnetic body 100 with minimizing the energy consumption.

Second Embodiment

Figure 4:
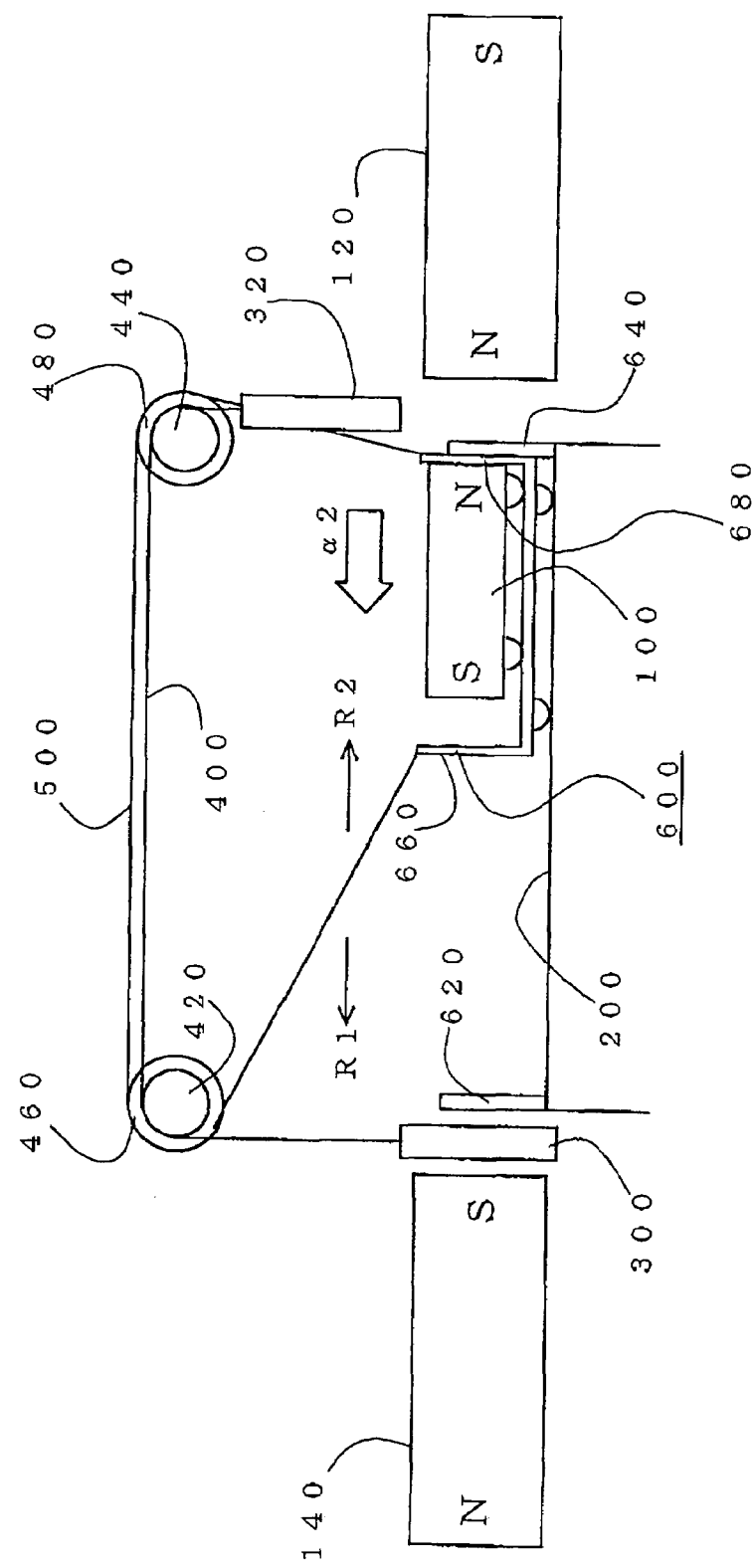
FIG. 4 is an elevation view showing a second embodiment of a driving apparatus according to the present invention.

FIG. 4 is an elevation view showing the second embodiment of the driving apparatus according to the present invention. In FIG. 2, similar or corresponding portions are designated by the same references as in the first embodiment, and descriptions therefor are omitted.

The second embodiment has first to third magnetic bodies with reversed magnetic poles from the magnetic bodies of the first embodiment. And a driving mechanism of the magnetic shield bodies are changed.

In FIG. 4, the first magnetic body 100 has S-pole at the left end and N-pole at the right end. The second and the third magnetic bodies 120 and 140 have N-pole at the left end and N-pole at the right end. The second magnetic body 120 generates a repulsion force in the first magnetic body 100, in the left direction (R1 direction). The third magnetic body 140 generates a repulsion force in the first magnetic body, in the right direction (R2 direction). Therefore, a similar effect can be obtained by the magnetic interaction of the repulsion force, not attractive force, between the first magnetic body and the second and third magnetic bodies 120 and 140.

The first magnetic body 100 is mounted on a reciprocating moving body 600 which is supported movably in the right and left direction on a bed 200 with sufficiently little friction. While, the first magnetic body 100 is supported movably in the right and left direction by the a reciprocating moving body 600 with sufficiently low friction.

The wire 500 for driving the pulleys 460 and 480 is connected with the reciprocating moving body 600 at both ends of the wire 500 so that the wire 500 is driven by the reciprocating moving body 600. Stoppers 620 and 640 are provided at both ends of the reciprocating moving body 600 so that a range of reciprocating movement on the reciprocating moving body 600 is set.

When a leftward acceleration a2 acts on the first magnetic body 100 due to the repulsion force against the second magnetic body 120, the first magnetic body 100 moves leftward up to the left end of the reciprocating moving body 600 and abuts the stopper 660. Then, the first magnetic body 100 pushes the reciprocating moving body 600 in the left direction R1.

On the other hand, when a rightward acceleration a1 acts on the first magnetic body 100 due to the repulsion force against the third magnetic body 140, the first magnetic body 100 moves rightward up to the right end of the reciprocating moving body 600 and abuts the stopper 680. Then, the first magnetic body 100 pushes the reciprocating moving body 600 in the right direction R2.

When the reciprocating moving body 600 reciprocates following to the first magnetic body 100, the pulleyes 460 and 480 are driven and rotated and the magnetic shield bodies 300 and 320 move up and down.

When the first magnetic body 100 reaches the right end of the bed 200 with abutting the right end of the reciprocating moving body 600, the magnetic shield body 300 falls so as to restrains the repulsion force between the first and third magnetic bodies 100 and 140. Then, the first magnetic body 100 is driven in the left direction R1 by the repulsion force between the first and second magnetic bodies 100 and 120.

While, when the first magnetic body 100 reaches the right end of the bed 200 with abutting the left end of the reciprocating moving body 600, the magnetic shield body 320 falls so as to restrains the repulsion force between the first and second magnetic bodies 100 and 120. Then, the first magnetic body 100 is driven in the right direction R2 by the repulsion force between the first and third magnetic bodies 100 and 140.

The second embodiment has similar effect as the first embodiment.

Third Embodiment

Figure 5:
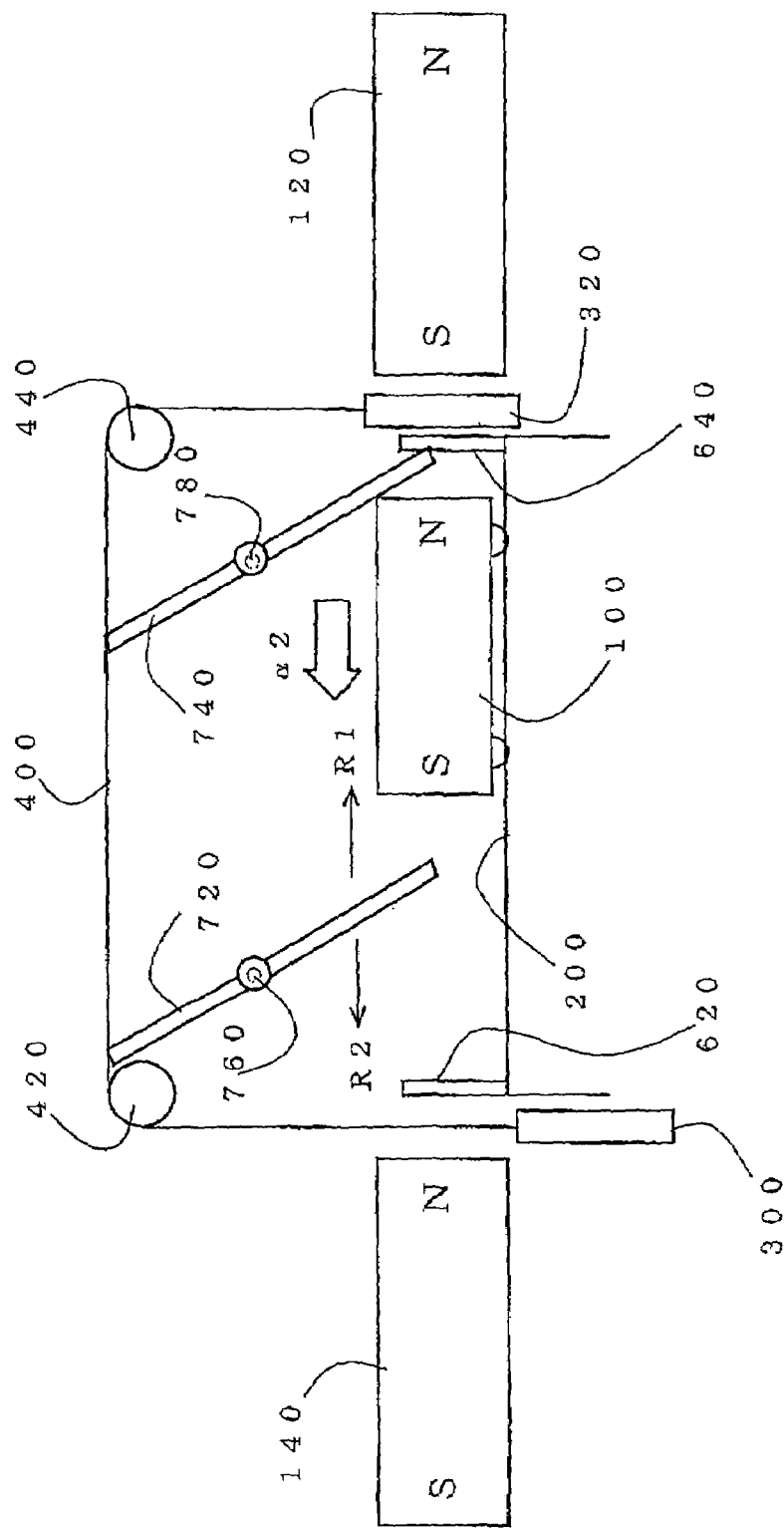
FIG. 5 is an elevation view showing a third embodiment of a driving apparatus according to the present invention.

FIG. 5 is an elevation view showing the third embodiment of the driving apparatus according to the present invention. In FIG. 4, similar or corresponding portions are designated by the same references as in the first embodiment, and descriptions therefor are omitted.

In the third embodiment, the driving mechanism of the magnetic shield body is changed.

In FIG. 5, the wire 400 for hanging the magnetic shield bodies 300 and 320 are connected with levers 720 and 740 at the top end of the levers 720 and 740. The levers 720 and 740 are pivoted, with pivots 760 and 780 fixed on an upper portion of the bed 200, at the middle portion of the levers 720 and 740. The levers are supported by the pivots 760 and 780 swingably in the right and left direction.

The lever 720 is positioned in the left half of the bed 200, a lower portion of the lever 720 is push leftward by the first magnetic body 100 during the first magnetic body 100 moves leftward. Then, lever 720 pulls the wire 400 rightward.

The lever 740 is positioned in the right half of the bed 200, a lower portion of the lever 740 is push rightward by the first magnetic body 100 during the first magnetic body 100 moves rightward. Then, lever 740 pulls the wire 400 leftward.

The stoppers 620 and 640 are provided at both ends of the bed 200 so that a range of leftward movement of the lower portion of the lever 720 is set by the stopper 620 and a range of rightward movement of the lower portion of the lever 740 is set by the stopper 640.

Since the levers 720 and 740 are directly connected with the wire 400, the mechanism for driving the magnetic shield bodies 300 and 320 si simplified.

The third embodiment has an effect of the simplicity of the magnetic shield body driving mechanism in addition to the effect of the first embodiment.

Fourth Embodiment

Figure 6:
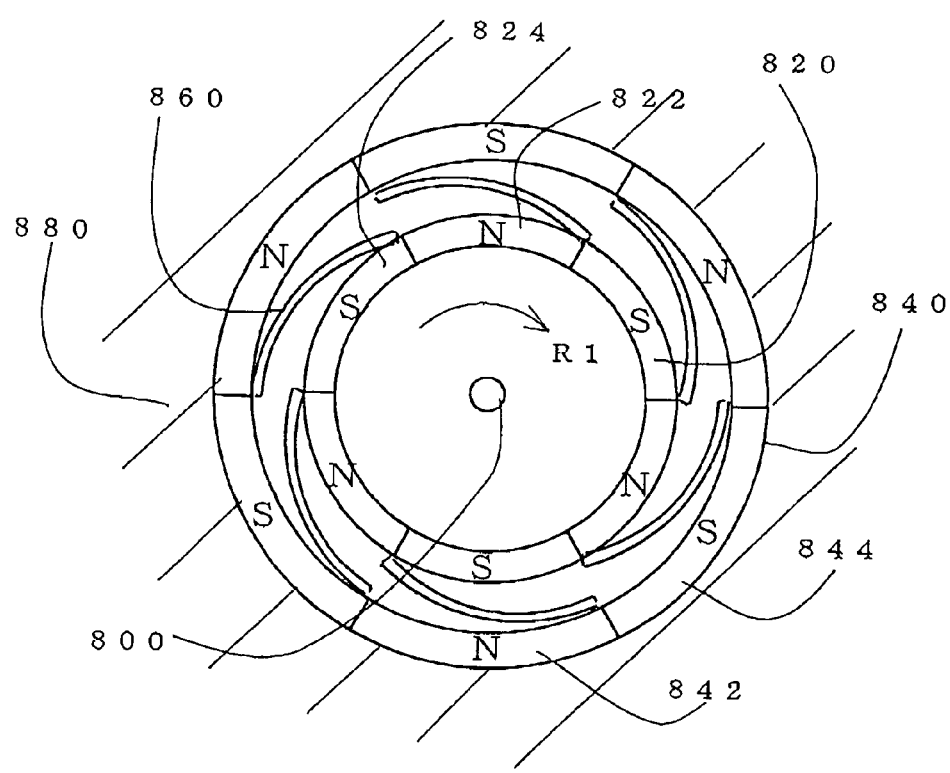
FIG. 6 is an elevation view showing a fourth embodiment of a driving apparatus according to the present invention.
Figure 7:
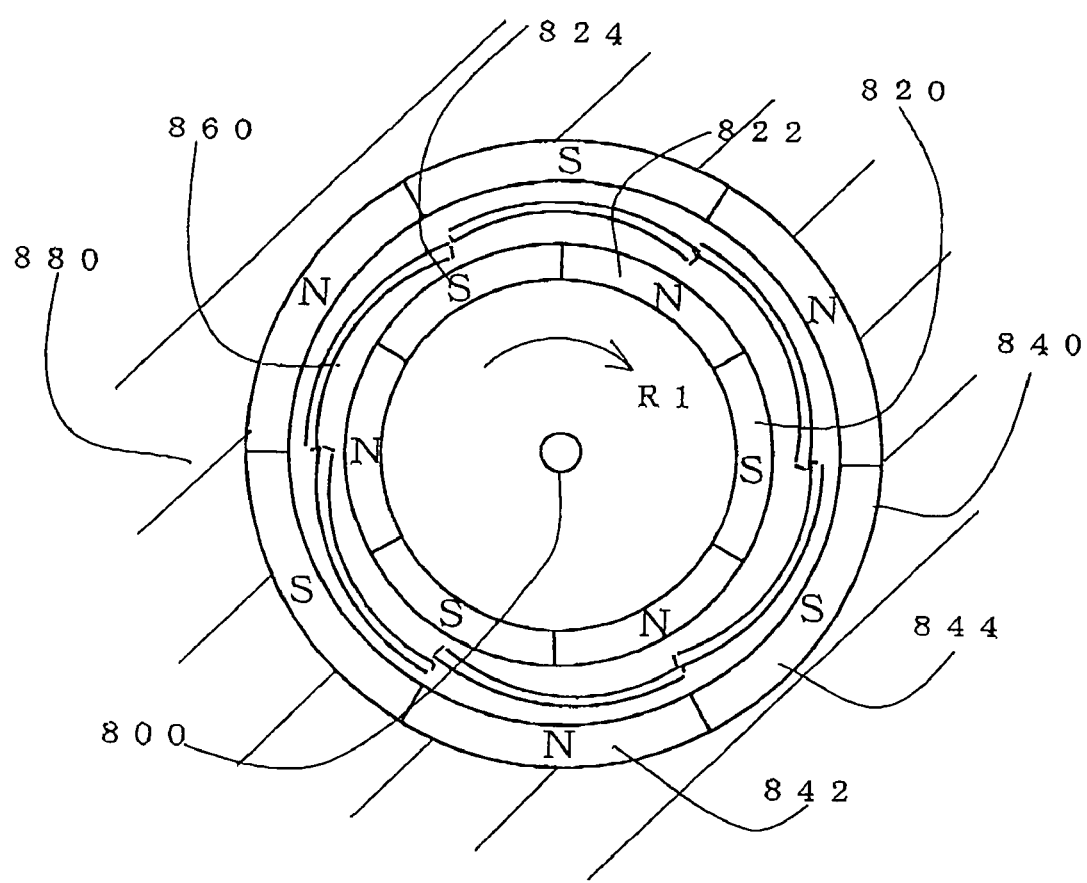
FIG. 7 is an elevation view showing another status of the driving apparatus in FIG. 6.
Figure 8:
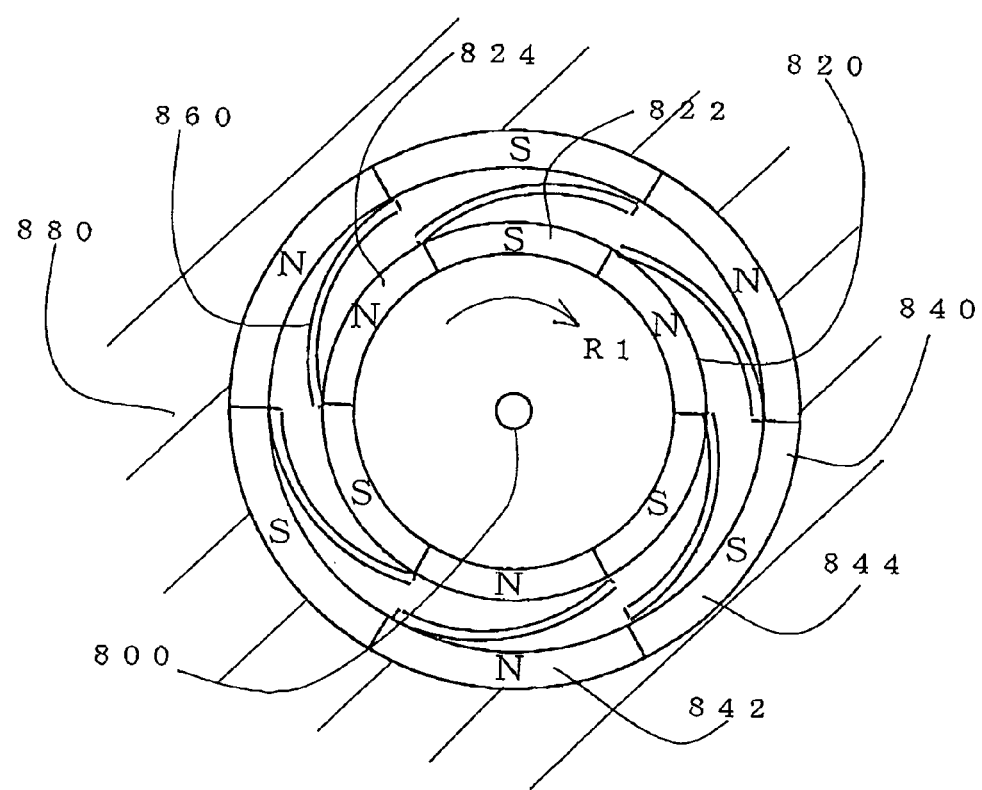
FIG. 8 is an elevation view showing further another status of the driving apparatus in FIG. 6.
Figure 9:
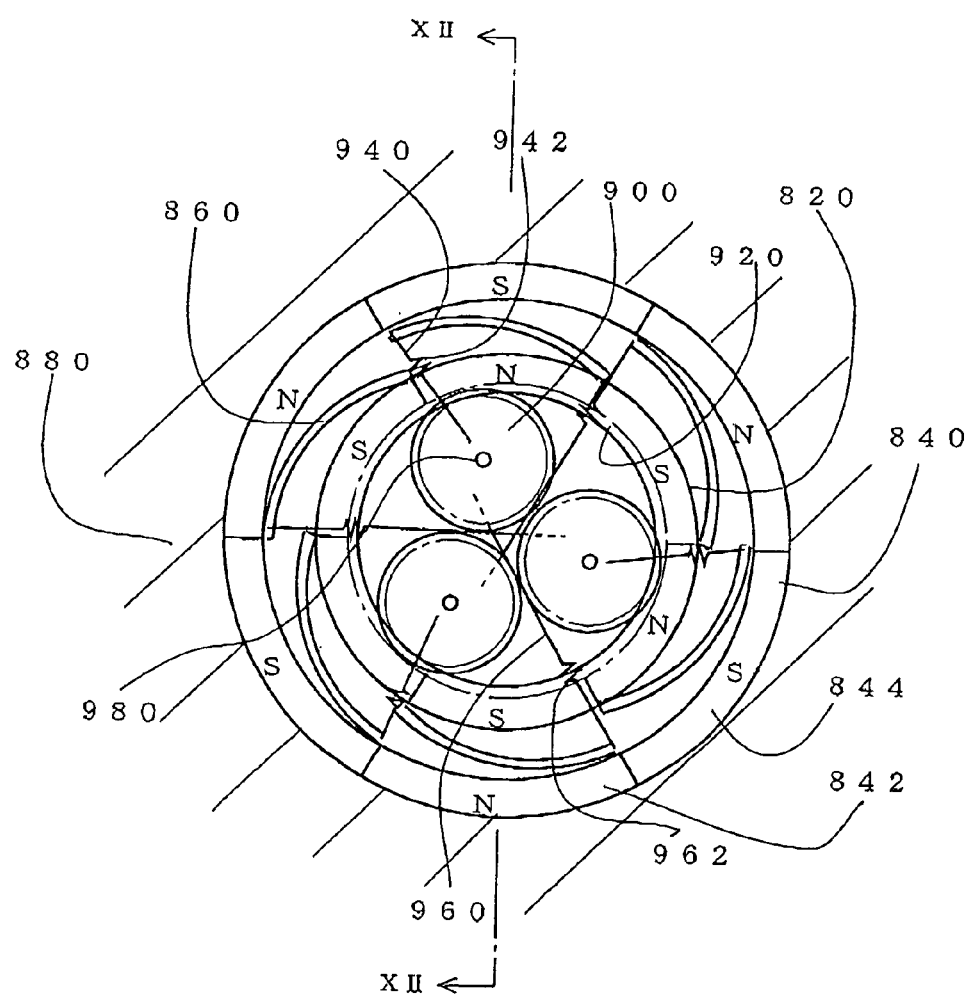
FIG. 9 is an elevation view showing a driving mechanism of the magnetic shield body in the fourth embodiment.
Figure 10:
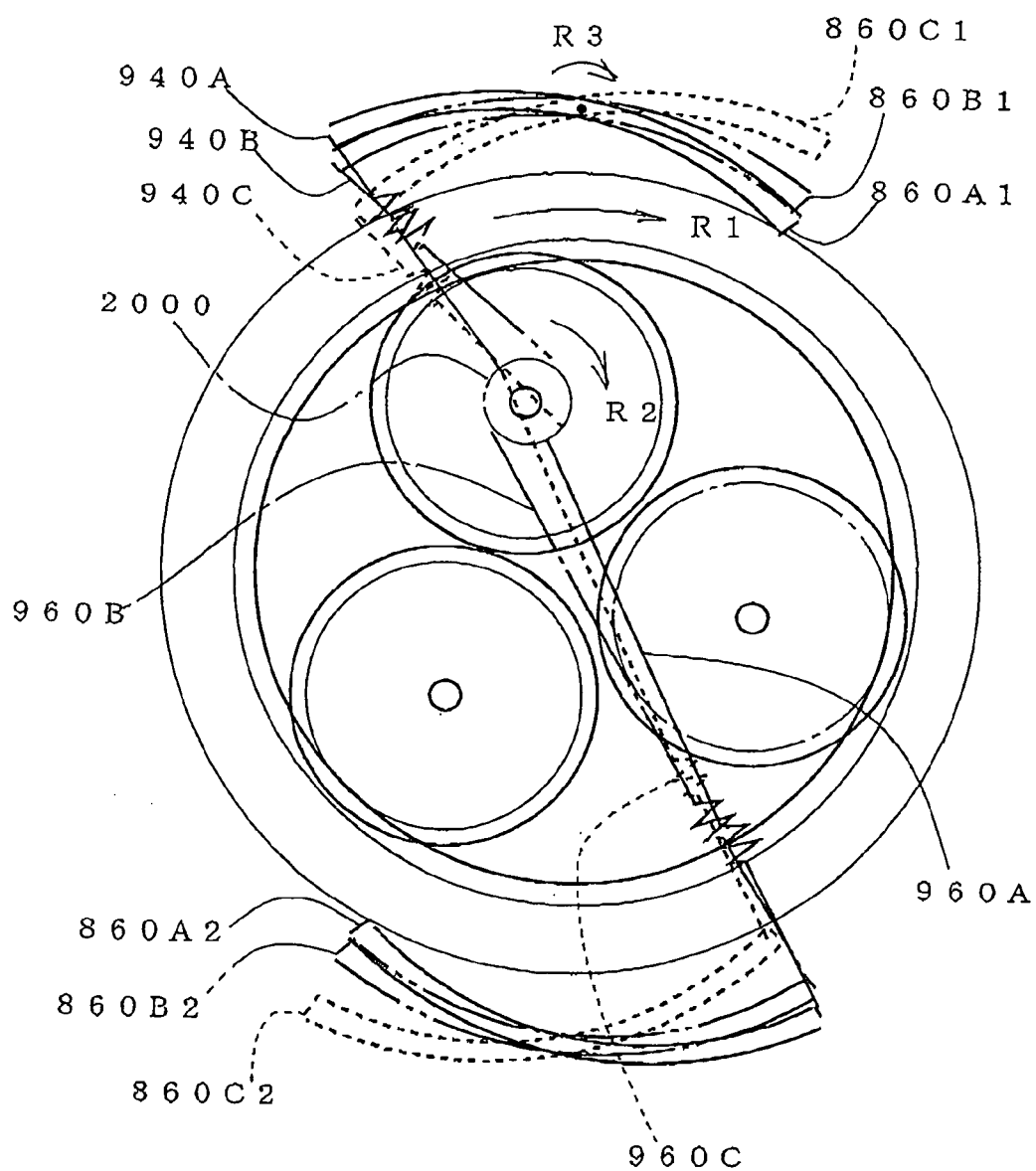
FIG. 10 is an elevation view showing the driving mechanism of the magnetic shield body in the fourth embodiment, for explaining the driving mechanism of the magnetic shield body by a pair of magnetic shield bodies at opposite position.
Figure 11:
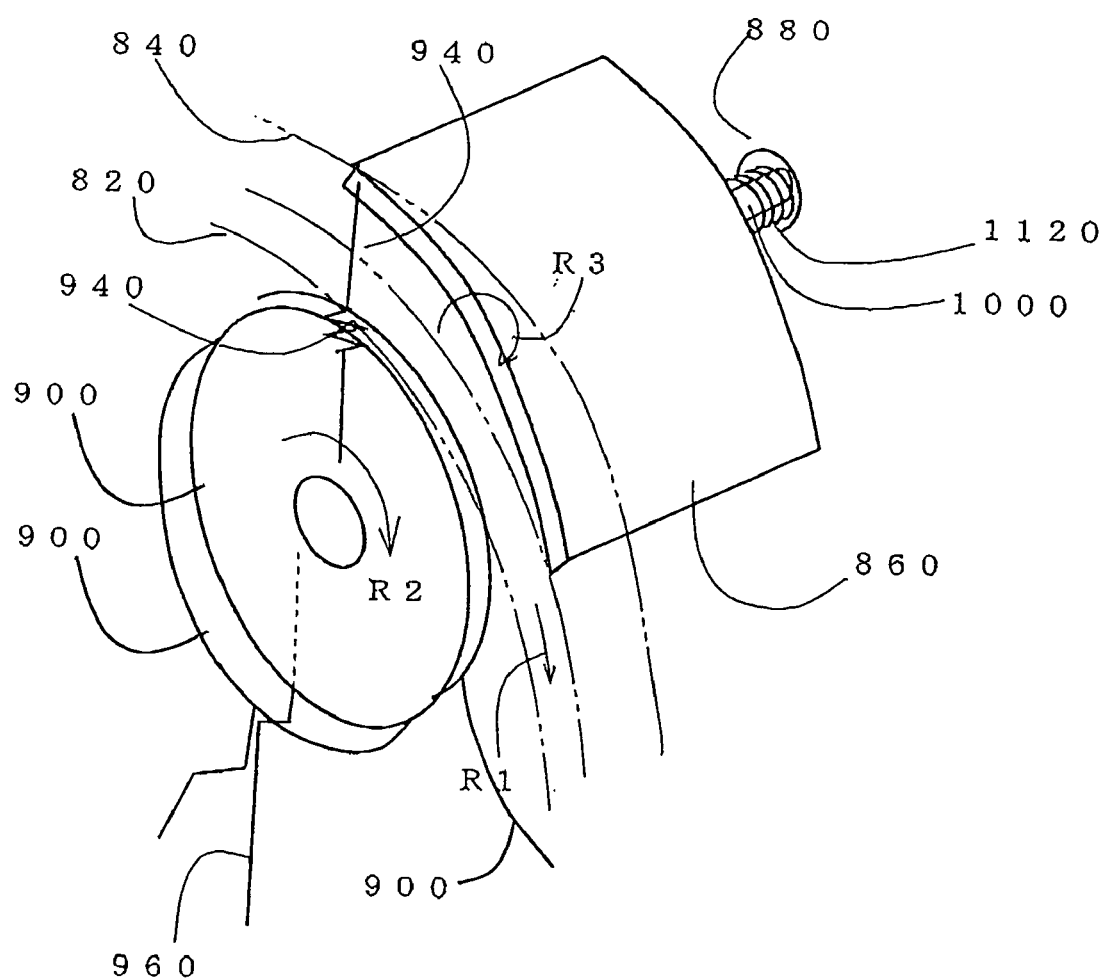
FIG. 11 is a perspective view showing the driving mechanism of the magnetic shield body in the fourth embodiment.
Figure 12:
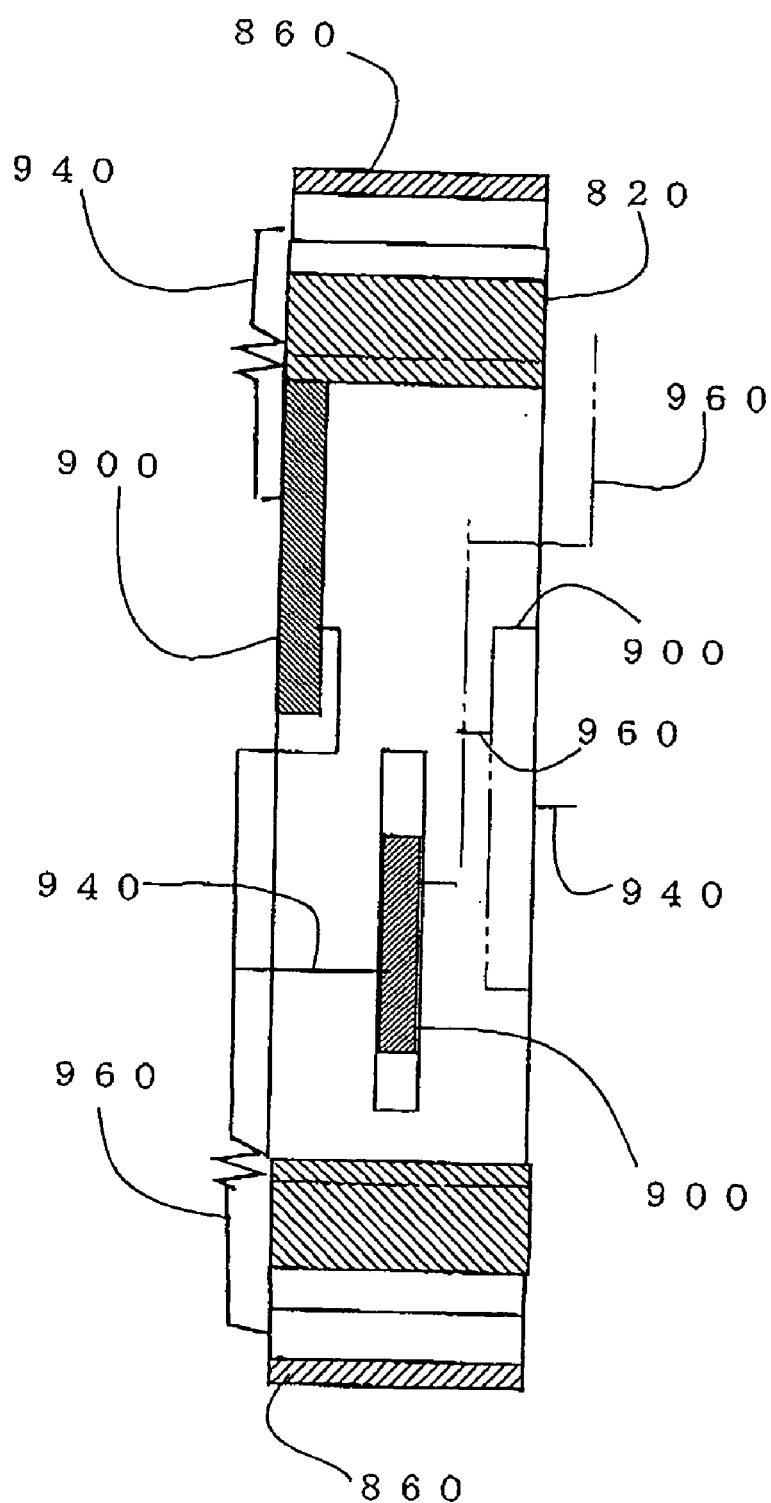
FIG. 12 is an elevation section view along a line XII—XII in FIG. 9.

FIG. 6 is an elevation view of the fourth embodiment of the driving apparatus according to the present invention, FIG. 7 is an elevation view showing another status of the driving apparatus in FIG. 6, FIG. 8 is an elevation view showing further another status of the driving apparatus in FIG. 6, FIG. 9 is an elevation view showing a driving mechanism of the magnetic shield body in the fourth embodiment, FIG. 10 is an elevation view showing the driving mechanism of the magnetic shield body in the fourth embodiment, for explaining the driving mechanism of the magnetic shield body by a pair of magnetic shield bodies at opposite position, FIG. 11 is a perspective view showing the driving mechanism of the magnetic shield body in the fourth embodiment, and FIG. 12 is an elevation section view along a line XII—XII in FIG. 9.

The fourth embodiment generates the rotating driving force only by controlling magnetic shield bodies with minimizing energy consumption.

In FIGS. 6 to 8, the driving apparatus has a rotor 802 rotatable centering and around a rotating shaft 800. A cylindrical magnetic body 840 is provided around the rotor 820, which is fixed concentric with the rotor 802. The rotating shaft 800 and the cylindrical magnetic body 840 are supported by a casing 880. The rotor 820 rotates together with or relative to the rotating shaft 800.

On an outer surface of the rotor 820, a plurality of N-poles 822 and S-poles 824 are mutually arranged one N-pole after one S-pole with an equal intervals. On an inner surface of the cylindrical magnetic body 840, a plurality of N-poles 842 and S-poles 844 are mutually arranged one N-pole after one S-pole with an equal intervals.

Between the rotor 820 and the cylindrical magnetic body 840, a plurality of magnetic shield bodies 860 corresponding to each of the N-poles 842 and S-poles 844. The magnetic shield body 860 controls magnetic fluxes occur between the rotor 820 and the cylindrical magnetic body 840 so that a rotational driving power in one direction (shown by R1 in the figure) is generated in the rotor 820 by the magnetic interaction between the rotor 820 and the cylindrical magnetic body 860.

There are provided three N-poles 822 and three S-poles 824 on the rotor 820, and there are provided three N-poles 842 and three S-poles 844 on the cylindrical magnetic body 840 corresponding to the N-poles 822 and S-poles 824.

At the status of FIG. 6, the N-poles 822 and S-poles of the rotor 820 are positioned corresponding to S-poles 844 and N-poles 842 of the cylindrical magnetic body 840. At this time, each the magnetic shield body 860 is adjacent at its one end to an border between adjacent N-pole 842 and S-pole 844. The magnetic shield body 860 gradually approaches the rotor 820 along the direction R1 so as to cover an outer surface of the S-poles 824 and the N-poles 822 which correspond to the N-pole 842 and S-poles 844, and the magnetic shield body 860 is adjacent at the other end to an border between adjacent S-pole 824 and N-pole 822. Therefore, the magnetic shield body 860 shields the magnetic fluxes between corresponding N-pole 842 and S-pole 824, and between S-pole 844 and N-pole 822.

The magnetic shield body 860 magnetically connects the N-pole 842 with the N-pole 822 of advanced phase in the R1 direction with respect to the N-pole 842, and magnetically connects the S-pole 844 with the S-pole 824 of advanced phase in the R1 direction with respect to the S-pole 844.

Therefore, a rotational driving power in the R1 direction is generated in the rotor 820 by the magnetic repulsion force.

At the status of FIG. 8, the N-poles 822 and S-poles of the rotor 820 are positioned corresponding to N-poles 842 and S-poles 844 of the cylindrical magnetic body 840.

At this time, each the magnetic shield body 860 is adjacent at its one end to an border between adjacent N-pole 842 and S-pole 844.

The magnetic shield body 860 gradually approaches the rotor 820 along the reverse direction of the direction R1 so as to cover the outer surface of the N-poles 822 and the S-poles 824 which correspond to the N-pole 842 and S-poles 844, and the magnetic shield body 860 is adjacent at the other end to the border between adjacent N-pole 822 and S-pole 824.

Therefore, the magnetic shield body 860 shields the magnetic fluxes between corresponding N-pole 842 and N-pole 822, and between S-pole 844 and S-pole 824.

The magnetic shield body 860 magnetically connects the N-pole 842 with the S-pole 824 of delayed phase in the R1 direction (shifted in the reverse direction to the direction R1) with respect to the N-pole 842, and magnetically connects the S-pole 844 with the N-pole 822 of delayed phase in the R1 direction (shifted in the reverse direction to the direction R1) with respect to the S-pole 844.

Therefore, a rotational driving power in the R1 direction is generated in the rotor 820 by the magnetic attractive force.

At the status of FIG. 7, the rotor 820 is at a middle position between the positions of FIG. 6 and FIG. 8. The magnetic shield bodies 860 is parallel to an outer surface of the rotor 820 and substantialy cover all over the outer surface of the rotor 820. Therefore, the rotor 820 and the cylindrical magnetic body 840 are magnetically insulated from each other, and the cylindrical magnetic body 840 influences little influence on the rotor 820.

The magnetic shield body 860 swings along the radius direction of the rotor 820 by a driving mechanism. It is omitted in FIGS. 6 to 8. In FIG. 6. The magnetic shield body 860 is driven repeatedly between the inclination status, shown in FIG. 6, approaching rotor 820 along the R1 direction and the inclination status shown in FIG. 8 approaching rotor 820 along the reverse direction to the R1 direction. At the middle status shown in FIG. 7, the magnetic shield body is parallel to the rotor 820.

The status of FIGS. 6, 7 and 8 of the driving apparatus are repeated in the order of FIG. 6, FIG. 7, FIG. 8, FIG. 7 and FIG. 6. It is prevented that the magnetic driving power (resistance power) in the reverse direction to the direction R1 occurs during the transfer from the status that the rotational driving power in the R1 direction due to magnetic repulsion force is generated as shown in FIG. 6 to the status that the rotational driving power in R1 direction due to magnetic attractive force is generated as shown in FIG. 8.

So, the rotational driving power is efficiently generated.

The magnetic shield body 860 swings synchronously with the rotor 820 in the radius direction by a driving mechanism shown in FIGS. 9 to 12.

In FIG. 9, the driving mechanism has inner gear 920 shaped on a inner surface of the rotor 820, three gears 900 engaging with the inner gear 920 and wires 940 and 960 connected to the gears 900. The gear 900 rotates around a fixed rotational shaft 980 relative to the casing 880.

The magnetic shield bodies 860 are arranged corresponding to the N-poles 842 and S-poles 844. The S-poles 844 are arranged at the position shifted by 60 degree from the adjacent N-poles 842. The gears 900 are arranged corresponding to each pair of adjacent N-pole 842 and S-pole 844 which are positioned at the phase difference of 120 degree.

The wire 940 connects one end at the N-pole 842 side (one end of the reverse direction to the direction R1) of the magnetic shield body 842 to the gear 900. The wire 960 connects one end at the S-pole 844 side (one end of the reverse direction to the direction R1) of the magnetic shield body 842 to the gear 900. The connection points of the wires 940 and 960 to the gear 900 are moved as the gear 900 rotates. Then, the end of the magnetic shield body 860 is repeatedly pulled.

The pitch circle of the gear 900 has a diameter equal to one third of the diameter of the inner gear 920. So, the gear 900 rotates three times by the one time rotation of the rotor 820. The gear 900 pulls the end (end in the reverse direction to the direction R1) of the magnetic shield body 860 through the wires 940 and 960 from the status in FIG. 6 and FIG. 9 so as to swing the magnetic shield body 860.

FIG. 10 shows movement of the magnetic shield bodies 860 at opposite positions which are driven by one gear 900. The magnetic shield body 860 at the position of FIG. 6 is shown by references 860A1 and 860A2. The magnetic shield body 860 at the position of FIG. 7 is shown by references 860B1 and 860B2. The magnetic shield body 860 at the position of FIG. 8 is shown by references 860C1 and 860C2.

The wire 940 at the position of FIG. 6 is shown by reference 960A. The wire 940 at the position of FIG. 7 is shown by reference 960B. The wire 940 at the position of FIG. 8 is shown by reference 960C.

The connection points of the wires 940 and 960 to the gear 900 move along a circle (shown by reference 2000 in FIG. 10) centering on the rotational shaft 980 and swing the magnetic shield bodies 860 and 860. The connection points of the wires 940 and 960 are at the opposite side of the gear 900 so that an interference between the wires 940 and 960 is prevented.

As shown in FIGS. 11 and 12, the three gears 900 are shifted in the axial direction of the rotational shaft 800 so that the wires 940 and 960 of one gear 900 does not interfere with wires 940 and 960 of other gears 900. The wires 940 and 960 of one gear 900 are bended so as not to interfere with other gears 900.

As shown in FIG. 10, the magnetic shield body 860 is swingably supported through a rotational shaft 1000 at a middle position of the magnetic shield body 860 by the casing 880. A coil spring 1120 for pulling the magnetic shield body 860 so that one end (end in the reverse direction to the direction R1) of magnetic shield body 860 departs (in direction R3) from the rotor 820.

When the rotor 820 rotates in the R1 direction, the gear 900 rotates in the R2 direction. The end (end in the reverse direction to the direction R1) of the magnetic shield body 860 is pulled from the status of FIG. 6. The magnetic shield body 860 is driven to swing against the elastic power of the coil spring 1120 to the successive statuses of FIGS. 7 and 8.

The status when the rotor 820 rotates by 30 degree from the status of FIG. 6 is the status of FIG. 7. The status when the rotor 820 rotates by 60 degree from the status of FIG. 6 is the status of FIG. 8. When the rotor 820 rotates further by 30 degree, the magnetic shield body 860 is returned to the status of FIG. 7 by the elastic power of the coil spring 1120. And, when the rotor 820 rotates further by 30 degree, the magnetic shield body 860 is returned to the status of FIG. 6 by the elastic power of the coil spring 1120.

Therefore, by the rotation of 120 degree of the rotor 820, the gear 900 rotates once and the magnetic shield body 860 finishes one cycle movement.

The period of the magnetic shield body 860 corresponds number of N and S-poles of the rotor 820 and the cylindrical magnet body 840. This is "three" in the present embodiment.

The wire 940 and 960 have elastic bodies 942 and 962 at the middle portion. In FIG. 8, the end (end in the reverse direction of the direction R1) of the magnetic shield body 860 elastically touches the rotor 820. A excessive friction is prevented on the rotor 820, and the manufacturing errors of the gear 900 and wires 940 and 960 are absorbed.

As a driving mechanism of the magnetic shield body 860, any other driving mechanisms are applicable than the above.

As mentioned above, the rotational driving power can be generated only by the control of the magnetic shield body by means of the rotor 820 with minimizing the energy consumption.

However, there are provided 3 pairs of magnetic poles in the rotor 820 and cylindrical magnetic body 840, the number of magnetic pole pairs may be changed according to to manufacturing cost, rotation speed, rotational driving power and other conditions.

Advantages

According to the present invention, a driving power can be generated only by a control of a magnetic shield body with minimizing the energy consumption.

Therefore, the present invention may be applied to a semi-perpetual engine or a basic mechanism of semi-perpetual engine.

The inventor has a belief. There is fixed idea that a perpetual engine never exists. However, the tide power generation is a perpetual engine, it is said that the mineral such as tormalin and taumalin continuously emit far-ultra-red without energy input. There are magnetic cure machines which eternally work without energy supply.

What is claimed is:

1. A driving apparatus comprising:
   a rotor having a plurality of N-poles and S-poles on an outer surface, mutually arranged one N-pole after one S-pole with an equal intervals;
   a cylindrical magnetic body fixed around said rotor concentric with said rotor, which has a plurality of N-poles and S-poles on an inner surface facing said N-poles and S-poles of said rotor, mutually arranged one N-pole after one S-pole with an equal intervals;
   a plurality of magnetic shield bodies arranged between said rotor and said cylindrical magnetic body for controlling a magnetic flux between said rotor and said cylindrical magnetic body so that a constant rotation power is occurred on said rotor;
   wherein the number of respective N-poles and S-poles on said cylindrical magnetic body is the same as the number of respective N-poles and S-poles on said rotor and the total number of N-poles and S-poles on the cylindrical magnetic body is the same as the total number of shield bodies arranged between said rotor and said cylindrical magnetic body; and
   each shield body is capable of shielding a single N-pole or S-pole on said cylindrical magnetic body from a single N-pole or S-pole on said rotor.

* * * * *